(No Model.)
E. C. MARTIN.
WHEEL FOR VELOCIPEDES.
No. 579,886. Patented Mar. 30, 1897.
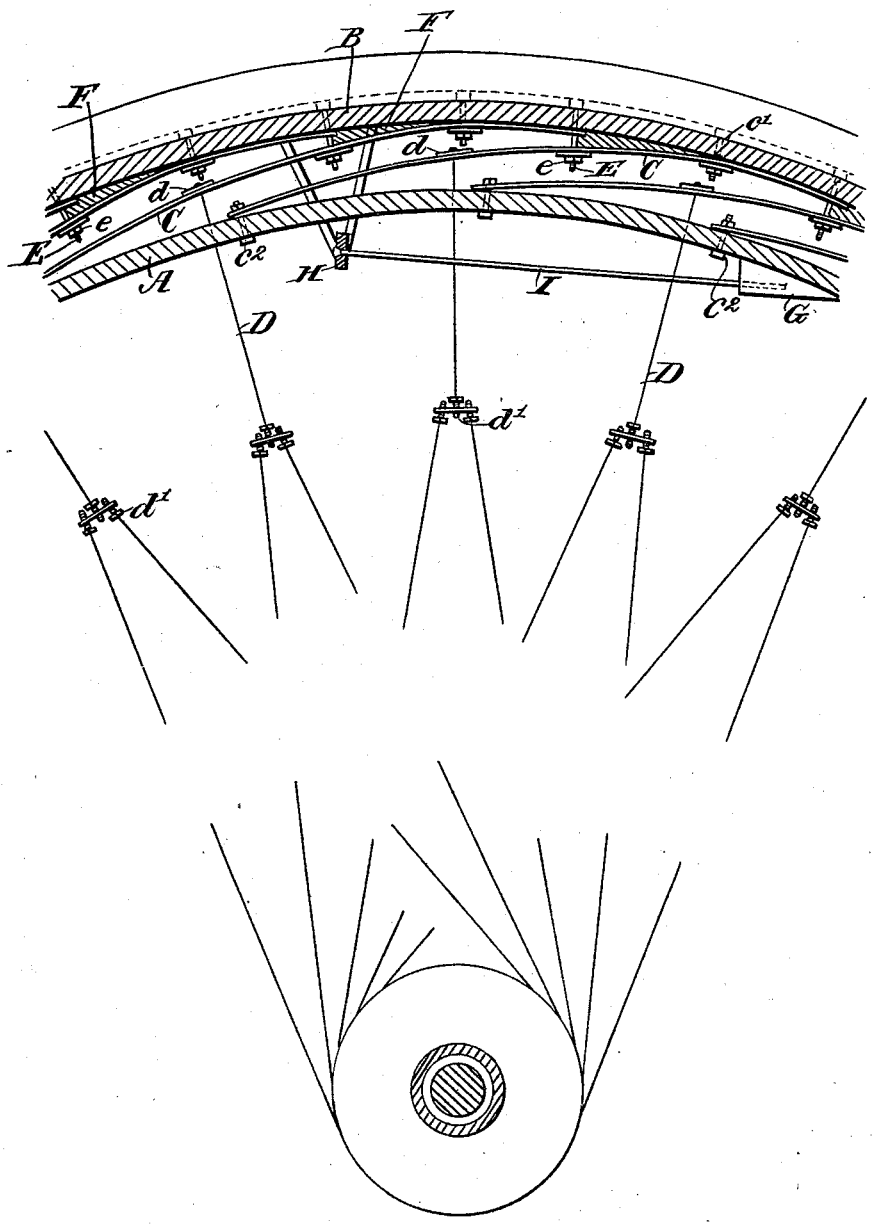
Witnesses,
Robert Everett
Thos. A. Gunn
Inventor:
Edward C. Martin,
By
James L. Norris.
Atty.

UNITED STATES PATENT OFFICE.

EDWARD CASTILDINE MARTIN, OF CAULFIELD, VICTORIA.

WHEEL FOR VELOCIPEDES.

SPECIFICATION forming part of Letters Patent No. 579,886, dated March 30, 1897.

Application filed August 12, 1893. Serial No. 602,512. (No model.)

*To all whom it may concern:*

Be it known that I, EDWARD CASTILDINE MARTIN, journalist, a subject of the Queen of Great Britain, residing at Heatherlea, Caulfield, near Rosstown Station, in the British Colony of Victoria, have invented an Improved Wheel for Velocipedes and other Light Vehicles, of which the following is a specification.

The object of this invention is to provide a wheel for velocipedes and other light vehicles which, while possessing the advantages of a wheel fitted with a pneumatic tire, will not be liable to puncture.

According to this invention the wheels are constructed with two concentric rims, so as to leave an annular space between them. This annular space is fitted with tangent springs, which take up any jar communicated to the outer rim and thus insure the vehicle traveling more smoothly and easily, as will be readily understood on reference to the accompanying drawing, which is a sectional elevation of part of a wheel constructed according to this invention.

A represents the inner and B the outer concentric rims, while C C represent the flat steel tangent springs, which are inserted in the annular space between said concentric rims, one end of each of said springs being secured to the inner rim A and the other end to the outer rim B.

The spokes D extend through the inner rim A and are secured (by being riveted over at their ends or otherwise) to the springs C, small disks or washers $d$ being fitted under the heads of said spokes in order to strengthen the springs where said spokes pass through them. Means, such, for instance, as the nipples indicated at $d'$, are provided for adjusting the tension of these spokes, and small screw-threaded bolts E may be passed through the springs C C and be fitted with correspondingly-threaded nuts $e$, as shown, in order to adjust the tension of the different springs C, which latter are secured to the outer rim B by the small bolts $c'$ and to the inner rim A by the bolts $c^2$, while at the same time said springs are long enough to extend to the adjusting-bolt E of the next spring, so that each adjusting-bolt will assist in retaining two springs in position. A piece of cork or other easily-compressible material may be inserted, as indicated at F, between the upper end of each spring and the outer rim B, partly to assist in securing the spring in position and partly to prevent dirt or grit finding a lodgement.

A pair of lugs or brackets G and H are secured one to the inner rim and the other to the outer rim. These lugs or brackets are connected together by a wire or rod I, having one of its ends screw-threaded and passed through a correspondingly-screw-threaded hole or nut in the bracket G, so as to enable a strain to be put on such rod and through the rims onto the tangent springs, thereby admitting of the wheel being readily tightened up when required.

The outer rim may be fitted with any approved tire, there being no necessity for its being fitted with an ordinary pneumatic tire, which this invention is intended to dispense with.

Having now particularly described and ascertained the nature of my said invention and in what manner the same is to be performed, I declare that what I claim is—

1. In a wheel, the combination of two concentric rims, tangent springs arranged between said rims and rigidly attached at their opposite ends respectively to said rims, and tension-adjusting devices attached to the outer of said rims and engaging each of said springs intermediate its ends, substantially as described.

2. In a wheel for velocipedes and other light vehicles having two concentric rims (such as A B) the combination therewith of a number of flat steel tangent springs (such as C C) inserted between said rims, one end of each of said springs being secured to the inner and the other to the outer rim while the ends of the spokes are passed through said inner rim and attached each to one of said springs substantially as and for the purposes specified and as illustrated in the accompanying drawing.

3. In a wheel, the combination of two concentric rims, tangent springs arranged between said rims and attached thereto at their opposite ends, spokes each attached at its outer end to one of said springs intermediate the ends of the latter, and means for adjusting the tension of said springs, substantially as described.

4. In a wheel, the combination of two concentric rims, tangent springs arranged between said rims and rigidly attached thereto at their opposite ends, and means for turning said rims in opposite directions and holding them in their adjusted positions, substantially as described and for the purpose specified.

5. In a wheel, the combination of two concentric rims, tangent springs arranged between said rims and attached thereto at their opposite ends, spokes passed through said inner rim and each attached to one of said springs, and means for adjusting the tension of said spokes, substantially as described.

6. In a wheel, the combination of two concentric rims A, B, tangent springs C arranged between said rims and attached thereto at their opposite ends, adjusting-bolts E passed through the outer rim and engaging the springs C, and blocks F of compressible material inserted between the ends of said springs and the outer rim, substantially as described.

EDWARD CASTILDINE MARTIN.

Witnesses:
EDWARD WATERS,
EDWARD WATERS, Jr.